United States Patent
Tisserand et al.

(10) Patent No.: US 10,935,293 B2
(45) Date of Patent: Mar. 2, 2021

(54) SYSTEMS AND METHODS FOR CONTROLLING DIFFERENTIAL REFRIGERANT PRESSURE

(71) Applicant: TRANE INTERNATIONAL INC., Davidson, NC (US)

(72) Inventors: Philippe Del Marcel Tisserand, Eloyes (FR); Yves Jacques Raimbault, Charmes (FR); Stephane Koenigsecker, Charmes (FR)

(73) Assignee: TRANE INTERNATIONAL INC., Davidson, NC (US)

(*) Notice: Subject to any disclaimer, the term of this patent is extended or adjusted under 35 U.S.C. 154(b) by 52 days.

(21) Appl. No.: 16/457,351

(22) Filed: Jun. 28, 2019

(65) Prior Publication Data

US 2020/0408450 A1 Dec. 31, 2020

(51) Int. Cl.
*F25B 49/02* (2006.01)
*F25B 31/00* (2006.01)

(52) U.S. Cl.
CPC .......... *F25B 49/025* (2013.01); *F25B 31/008* (2013.01); *F25B 2400/072* (2013.01);
(Continued)

(58) Field of Classification Search
CPC ................ F25B 49/025; F25B 2500/07; F25B 2600/17; F25B 2600/027; F25B 2600/111;
(Continued)

(56) References Cited

U.S. PATENT DOCUMENTS

| 8,434,323 B2 | 5/2013 | Welch et al. |
| 10,228,168 B2 | 3/2019 | Jonsson et al. |

(Continued)

FOREIGN PATENT DOCUMENTS

| EP | 0933603 A1 | 8/1999 |
| EP | 1614982 B1 | 8/2017 |

(Continued)

OTHER PUBLICATIONS

Extended European Search Report, European Patent Application No. 20182370.5, dated Nov. 24, 2020 (7 pages).

*Primary Examiner* — Jonathan Bradford
(74) *Attorney, Agent, or Firm* — Hamre, Schumann, Mueller & Larson, P.C.

(57) ABSTRACT

Systems and methods are provided for controlling compressor systems to ensure sufficient pressure differentials to provide cooling. A compressor system includes a compressor, a suction pressure sensor at a suction of the compressor, a discharge pressure sensor, a condenser, an expansion device, a liquid line, a liquid line pressure sensor, an evaporator, a condenser blower and a controller. The method includes determining a pressure target based on an intermediate pressure within the compressor and a threshold cooling differential pressure value, determining a pressure ratio setpoint based on the pressure target and a liquid line pressure measured by the liquid line pressure sensor, controlling the condenser blower to operate based on the determined pressure ratio setpoint, determining a subcooling setpoint based on the pressure target and the liquid line pressure in the compressor system, and controlling the expansion device to operate based on the subcooling setpoint.

16 Claims, 4 Drawing Sheets

(52) U.S. Cl.
CPC ..... *F25B 2500/07* (2013.01); *F25B 2600/027* (2013.01); *F25B 2600/111* (2013.01); *F25B 2600/17* (2013.01); *F25B 2600/2513* (2013.01); *F25B 2700/1931* (2013.01); *F25B 2700/1933* (2013.01)

(58) Field of Classification Search
CPC ...... F25B 2600/2513; F25B 2700/1931; F25B 2700/1933
See application file for complete search history.

(56) References Cited

U.S. PATENT DOCUMENTS

| | | | |
|---|---|---|---|
| 2010/0006264 A1* | 1/2010 | Jadric | F25B 31/008 165/104.19 |
| 2018/0031292 A1 | 2/2018 | Liu et al. | |
| 2018/0299157 A1* | 10/2018 | Jang | F24F 1/60 |
| 2019/0030984 A1* | 1/2019 | Zeigler | H05K 7/20881 |

FOREIGN PATENT DOCUMENTS

| | | |
|---|---|---|
| JP | H01114668 A | 5/1989 |
| WO | 2019/075105 A1 | 4/2019 |

* cited by examiner

SYSTEMS AND METHODS FOR CONTROLLING DIFFERENTIAL REFRIGERANT PRESSURE

FIELD

This disclosure is directed to compressor systems and methods of operating compressor systems to control airflow and expansion valve opening to ensure a sufficient differential refrigerant pressure for cooling components of the compressor system.

BACKGROUND

Cooling systems for some compressors use a pressure differential within the compressor system to provide cooling to compressor system components such as the compressor motor or an inverter. The pressure differential may need to be maintained at or above a threshold value to ensure that the cooling system functions properly. In some compressor systems, the differential pressure may vary depending on ambient temperature, water temperature at an evaporator in chiller systems, and the operational parameters of the compressor system.

SUMMARY

This disclosure is directed to compressor systems and methods of operating compressor systems to control airflow and expansion valve opening to ensure a sufficient differential refrigerant pressure for cooling components of the compressor system.

Refrigerant pressure differentials, such as a differential in pressure between the intermediate pressure within a compressor of the compressor system and a liquid line of the compressor system, may be used to provide cooling to compressor system components such as motors, inverters, bearings, and the like. In some compressor systems, refrigerant pressure differentials must be maintained at or above a threshold value for proper cooling of those components.

By adjusting a pressure ratio target and a cooling setpoint, operation of the compressor system may be adjusted to ensure that a refrigerant pressure differential sufficient for cooling is maintained by controlling the airflow and the aperture of an expansion device.

In an embodiment, a method of controlling a compressor system includes determining a pressure target based on an intermediate pressure within a compressor of the compressor system and a threshold cooling differential pressure value. The method also includes determining a pressure ratio setpoint based on the pressure target and a liquid line pressure within a liquid line of the compressor system. The method includes operating a condenser blower at speed determined based on the determined pressure ratio setpoint. The method further includes determining an subcooling setpoint based on the pressure target and the liquid line pressure in the compressor system, and operating an expansion device based on the determined subcooling setpoint.

In an embodiment, the intermediate pressure is determined based on a suction pressure of the compressor and a discharge pressure of the compressor.

In an embodiment, determining the pressure ratio setpoint includes comparing the pressure target and the liquid line pressure, when the pressure target exceeds the liquid line pressure, setting the pressure ratio setpoint to a current pressure ratio multiplied by a ratio of the pressure target to the liquid line pressure, when the liquid line pressure meets or exceeds the pressure target, setting the pressure ratio setpoint to the current pressure ratio.

In an embodiment, determining the speed comprises referencing a mathematical model correlating pressure ratio and condenser blower speed. In an embodiment, the method further includes applying a smoothing function to control a rate of change of the pressure ratio setpoint.

In an embodiment, the method further includes comparing the determined pressure ratio setpoint to a pressure ratio limit and setting the pressure ratio setpoint to the pressure ratio limit when the determined pressure ratio setpoint exceeds the pressure ratio limit.

In an embodiment, determining the subcooling setpoint includes determining a liquid pressure difference based on the pressure target and the liquid line pressure, determining a subcooling offset based on the liquid pressure difference, determining the subcooling setpoint based on the subcooling offset and a current subcooling value.

In an embodiment, determining the subcooling offset includes referencing a mathematical model correlating the subcooling offset with the liquid pressure difference. In an embodiment, the method further includes applying a smoothing function to control a rate of change in the subcooling setpoint.

In an embodiment, operating the expansion device based on the subcooling setpoint comprises setting an aperture size of the expansion device based on the subcooling setpoint.

In an embodiment, a compressor system includes a compressor, a condenser, an expansion device fluidly connected to the condenser by a liquid line, a liquid line pressure sensor at a liquid line of the compressor system, an evaporator, a blower configured to drive an airflow over the condenser and a controller. The controller is configured to determine a pressure target based on an intermediate pressure within the compressor and a threshold cooling differential pressure value, determine a pressure ratio setpoint based on the pressure target and a liquid line pressure measured by the liquid line pressure sensor, control the blower to operate at a speed determined based on the determined pressure ratio setpoint, determine a subcooling setpoint based on the pressure target and the liquid line pressure in the compressor system, and control the expansion device to operate based on the subcooling setpoint.

In an embodiment, the expansion device is a controllable electronic expansion valve. In an embodiment, the processor is configured to control the expansion device to operate based on the subcooling setpoint by setting an aperture size for the controllable electronic expansion valve.

In an embodiment, the processor is further configured to determine the intermediate pressure within the compressor based on a suction pressure measured by the suction pressure sensor and a discharge pressure measured by the discharge pressure sensor.

In an embodiment, the controller is configured to determine a pressure ratio setpoint by comparing the pressure target and the liquid line pressure, when the pressure target exceeds the liquid line pressure, setting the pressure ratio setpoint to a current pressure ratio multiplied by a ratio of the pressure target to the liquid line pressure, when the liquid line pressure meets or exceeds the pressure target, setting the pressure ratio setpoint to the current pressure ratio.

In an embodiment, the controller is configured to determine a subcooling setpoint by determining a liquid pressure difference based on the pressure target and the liquid line pressure, determining a subcooling offset based on the liquid pressure difference, and determining the subcooling setpoint based on the subcooling offset and a current subcooling value.

DETAILED DESCRIPTION

This disclosure is directed to compressor systems and methods of operating compressor systems to control airflow and expansion valve opening to ensure a sufficient differential refrigerant pressure for cooling components of the compressor system.

Figure 1:
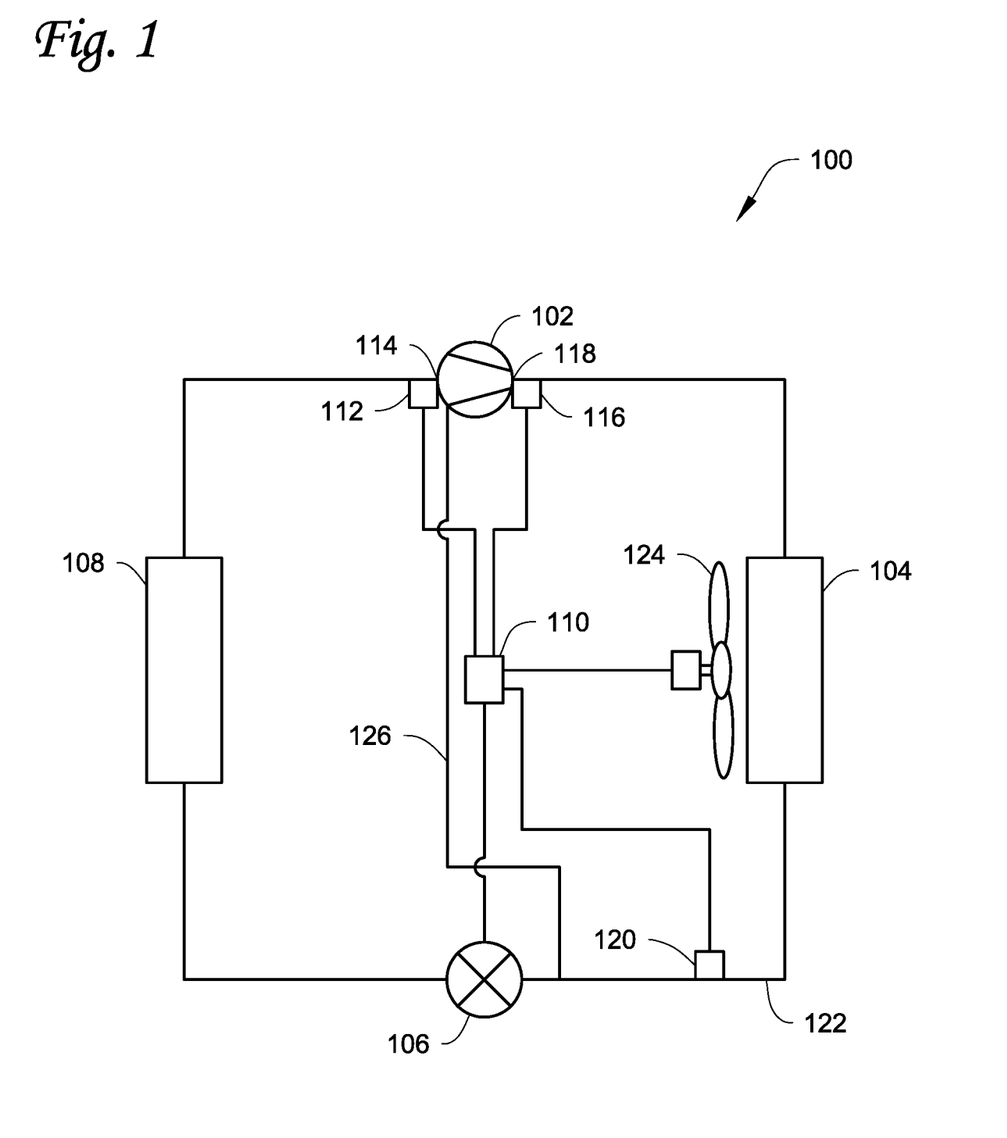
FIG. 1 shows a compressor system according to an embodiment.

FIG. 1 shows a compressor system 100 according to an embodiment. Compressor system 100 includes compressor 102, condenser 104, expansion device 106 and evaporator 108, fluidly connected to one another. Compressor system 100 also includes controller 110. Compressor system 100 further includes suction pressure sensor 112 at suction 114 of compressor 102, a discharge pressure sensor 116 at discharge 118 of compressor 102, and a liquid line sensor 120 located along a liquid line 122 between the condenser 104 and expansion device 106 with respect to the flow of working fluid through compressor system 100. A cooling line 126 may run from liquid line 122 to compressor 102 and/or other components of compressor system 100.

Compressor 102 is a compressor that compresses a working fluid of the compressor system 100. Compressor 102 may be, for example, a centrifugal compressor, or any other suitable type of compressor. Compressor 102 may include a motor. In an embodiment, the motor of compressor 102 is configured to be cooled by the working fluid of compressor system 100. In an embodiment, the cooling of the motor of compressor 102 may be affected by a pressure differential within the compressor system 102. In an embodiment, cooling may be provided by introducing working fluid from liquid line 122 via cooling line 126 into parts of compressor 102. The working fluid introduced into those parts of compressor 102 expands, absorbing heat and cooling the parts of compressor 102, then the working fluid joins other working fluid of compressor system 100, and is compressed by compressor 102. Compressor 102 receives the working fluid at suction 114 and compressed working fluid leaves compressor 102 at discharge 118. The compressed working fluid then passes to condenser 104. The compressor 102 may have a pressure ratio, determined by the pressure at discharge 118 divided by the pressure at suction 114.

Condenser 104 includes a heat exchanger. Condenser 104 receives the compressed working fluid from compressor 102, and the working fluid rejects heat via the heat exchanger at condenser 104. The rejection of heat at condenser 104 condenses the working fluid to a liquid. Condenser 104 may be in thermal communication with an ambient environment, and reject heat to that ambient environment. One or more blowers 124 may provide airflow over the condenser 104. The one or more blowers may be controlled by controller 110 to provide a variable airflow. In an embodiment, the one or more blowers are operated at a value corresponding to a percentage of the airflow that can be provided by the one or more blowers 124. The one or more blowers may affect the heat transfer of the working fluid within condenser 104. The heat transfer at condenser 104 affects the pressure at condenser 104 and may influence the suction pressure at suction 114 and the pressure ratio of the compressor. Heat transfer at condenser 104, affected by the operation of the one or more blowers 124, also may affect the liquid line pressure at liquid line 122.

Liquid line 122 provides fluid connection between condenser 104 and expansion device 106. One or more liquid line sensors 120 may be located along liquid line 122. The one or more liquid line sensors 120 include a pressure sensor to measure the pressure of the fluid within liquid line 122. The pressure sensor may be any suitable pressure sensor for measuring pressure of the fluid within liquid line 122. In an embodiment, the one or more liquid line sensors 120 further include a temperature sensor.

Cooling line 126 may provide a fluid connection between liquid line 122 and components of compressor system 100 that are to be cooled. Cooling line 126 may convey some of the working fluid from liquid line 122 to the compressor system 100 components that are to be cooled, such a motor and/or an inverter of compressor 102. The working fluid from cooling line 126 may be expanded, absorbing heat at the compressor system 100 components being cooled. For the components of compressor 102, the expansion of the working fluid from cooling line 126 may be expansion to the intermediate pressure of the compressor 102.

Expansion device 106 is a device configured to reduce the pressure of the working fluid. As a result, a portion of the working fluid is converted to a gaseous form. Expansion device 106 may be, for example, an expansion valve, orifice, or other suitable expander to reduce pressure of a refrigerant such as the working fluid. In an embodiment, expansion device 106 includes multiple orifices. In an embodiment, the multiple orifices of expansion device 106 have different sizes. Expansion device 106 may be a controllable expansion device having a variable aperture. In an embodiment, expansion device 106 is an electronic expansion valve. Expansion device 106 may be controlled by controller 110 to adjust its effects on flow and expansion of the working fluid, for example by controlling aperture size of an expansion valve or the number and size of orifices in use based on a signal from controller 110.

Evaporator 108 receives working fluid from expansion device 106. Evaporator 106 includes a heat exchanger where the working fluid can absorb heat, for example absorbing heat from an airflow to be provided to a building to cool the airflow. Compressor system 100 may be part of an HVACR system. The HVACR system may be, for example, an air-cooled water chiller. This airflow exchanges heat with the working fluid in the evaporator 108, which absorbs heat from the airflow and evaporates the working fluid.

Controller 110 is a controller which may be operatively coupled to at least suction pressure sensor 112, discharge pressure sensor 116, the one or more liquid line sensors 120, expansion device 106, and the one or more blowers 124. Controller 110 may be operatively coupled to suction pressure sensor 112, discharge pressure sensor 116, and the one or more liquid line sensors 120 such that controller 110 receives pressure readings from each. Controller 110 may further be operatively connected to the one or more liquid line sensors 120 such that controller 120 receives a liquid line temperature. Controller 110 may be operatively coupled to expansion device 106 such that controller 110 can provide commands to expansion device 106. Controller 110 may be operatively connected to the one or more blowers 124 such that it can provide commands to the one or more blowers 124. Controller 110 may include one or more processors and one or more memories.

Controller 110 may be configured to determine a pressure target based on an intermediate pressure within the compressor 102 and a threshold cooling differential pressure value. In an embodiment, the pressure target may be a sum of the intermediate pressure in compressor 102 and the threshold cooling differential pressure value. In an embodiment, the threshold cooling differential pressure value is a value stored in a memory of controller 110.

Controller 110 may be configured to determine the intermediate pressure in compressor 102. In an embodiment, controller 110 is configured to determine the intermediate pressure based on the suction pressure measured by 112 and the discharge pressure measured by 116. In an embodiment, controller 110 determines the intermediate pressure in compressor 102 by taking a square root of the product of the suction pressure measured by 112 and the discharge pressure measured by 116.

Controller 110 may be configured to determine a pressure ratio setpoint based on the pressure target and a liquid line pressure measured by the one or more liquid line sensors 120. The pressure ratio setpoint may be a desired pressure ratio. The pressure ratio may be defined by the discharge pressure of compressor 102 divided by the suction pressure of compressor 102. Airflow over condenser 104 may affect the condensation of the working fluid in condenser 104 that is received from discharge 118 of compressor 102 and pressure within condenser 104. The airflow over condenser 104 may thus affect the discharge pressure and pressure ratio of compressor 102. In an embodiment, the pressure ratio setpoint is determined by comparing the pressure target with the pressure in liquid line 122, measured by the one or more liquid line sensors 120, and when the pressure target exceeds the pressure in liquid line 122, setting the pressure ratio target to the current pressure ratio multiplied by the ratio of the pressure target to the pressure in liquid line 122. When the pressure in liquid line 122 exceeds the pressure target, the pressure ratio setpoint may be maintained at a current level.

Controller 110 may be configured to control the one or more blowers to operate at a speed determined based on the determined pressure ratio setpoint. The control of the blower may be any suitable control loop used to control airflow from the one or more blowers 124 to achieve the determined pressure ratio setpoint. In an embodiment, the control loop used to control the airflow is a closed-loop control. In an embodiment, the control loop used to control the airflow includes a proportional-integral-derivative (PID) control loop.

Controller 110 may be configured to determine a subcooling setpoint based on the pressure target and the liquid line pressure in the compressor system. The subcooling setpoint is a setpoint that may be used as a control parameter for expansion device 106. Expansion device 106 controls flow out of liquid line 122, and thus the subcooling setpoint and corresponding control of expansion device 106 may affect the differential pressure in compressor system 100. In an embodiment, controller 110 is configured to determine the subcooling setpoint by determining a liquid pressure difference based on the difference between the pressure target and the actual pressure within liquid line 122 measured by the one or more liquid line sensors 120. The pressure difference may be converted to a temperature offset for subcooling. The temperature offset may then be applied to a current subcooling value to obtain the subcooling setpoint. Controller 110 may be configured to control the expansion device 106 based on the subcooling setpoint, for example by adjusting an aperture size within expansion device 106. The control of expansion valve 106 may be through any suitable control loop for controlling expansion device 106 based on the subcooling setpoint. In an embodiment, the control of the expansion device 106 may reference a liquid line temperature measured by the one or more liquid line sensors 120. In an embodiment, the control loop used to control the expansion device 106 is a closed-loop control. In an embodiment, the control loop used to control the expansion device 106 includes a PID control loop.

Figure 2:
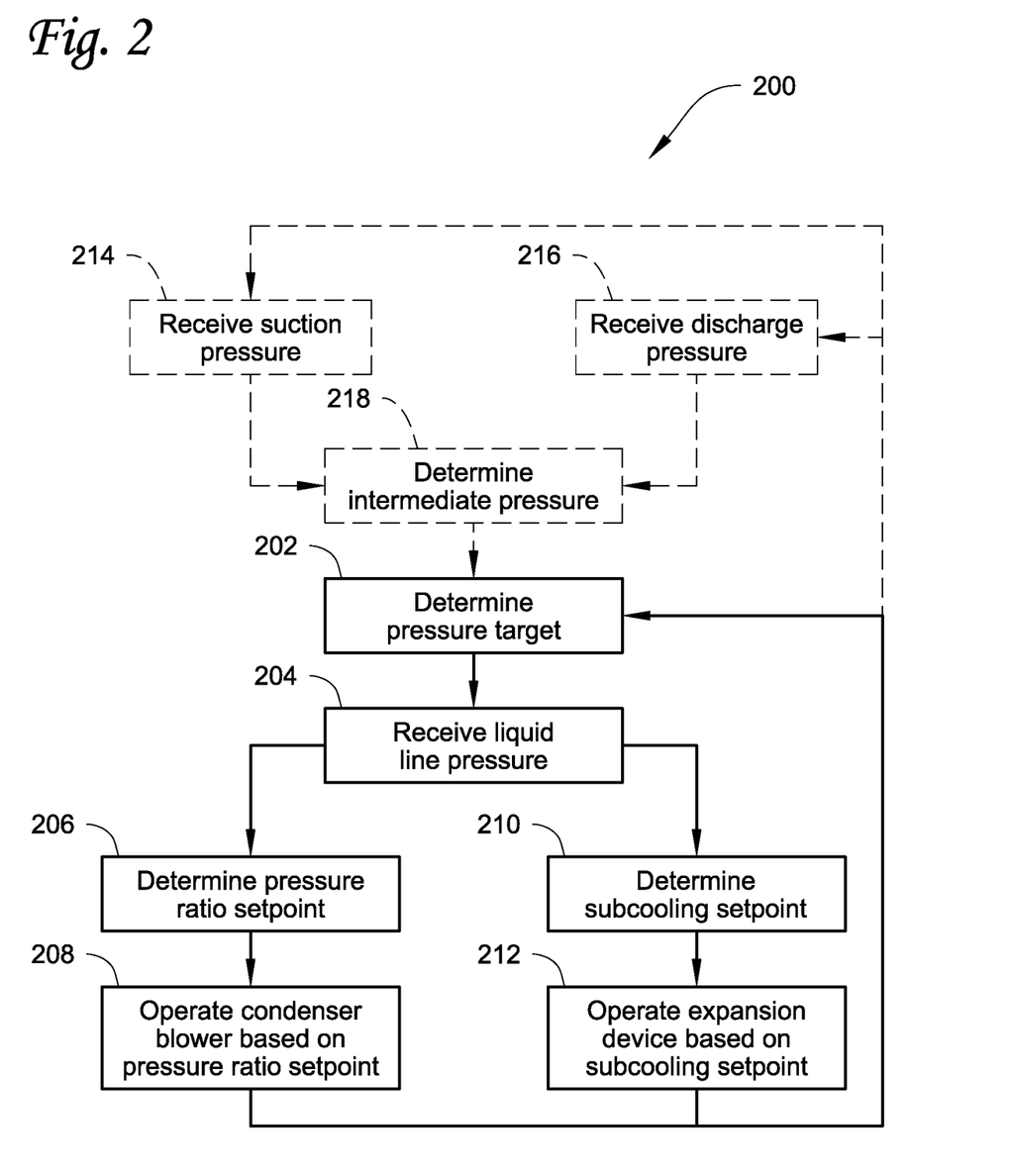
FIG. 2 shows a flowchart of a method of controlling a compressor system according to an embodiment.

FIG. 2 shows a flowchart of a method 200 of controlling a compressor system according to an embodiment. A pressure target is determined 202. A liquid line pressure is received 204. A pressure ratio setpoint is determined 206, and a condenser blower is operated based on the pressure ratio setpoint 208. Also, a subcooling setpoint is determined 210, and an expansion device is operated based on the subcooling setpoint 212.

A pressure target is determined 202. The pressure target may be a pressure level to maintain cooling of components of one or more compressor system components such as a compressor motor, an inverter, or any other component cooled at least in part using a working fluid of the compressor system. The pressure target may be determined based on a pressure differential used to provide cooling to the one or more compressor system components. The pressure target may be based on an intermediate pressure within the compressor and a threshold cooling differential pressure value. In an embodiment, the pressure target is determined by adding a minimum compressor cooling differential pressure value to an intermediate pressure within the compressor. Optionally, in an embodiment the intermediate pressure is determined 218 based on measured suction and discharge pressures. The minimum compressor cooling differential pressure value may be a value stored in memory. The threshold cooling differential may be determined based on the cooling demand of components of the compressor system. In an embodiment, the threshold cooling differential may be a value calculated based on one or more operational parameters of the compressor. In an embodiment, the threshold cooling differential may be determined based on a mathematical model correlating pressure required for cooling with the one or more operational parameters of the compressor.

A liquid line pressure is received 204. The liquid line pressure may be a value measured by a pressure sensor located along the liquid line, such as the one or more liquid line sensors 120 along liquid line 122 as shown in FIG. 1 and described above.

Figure 3:
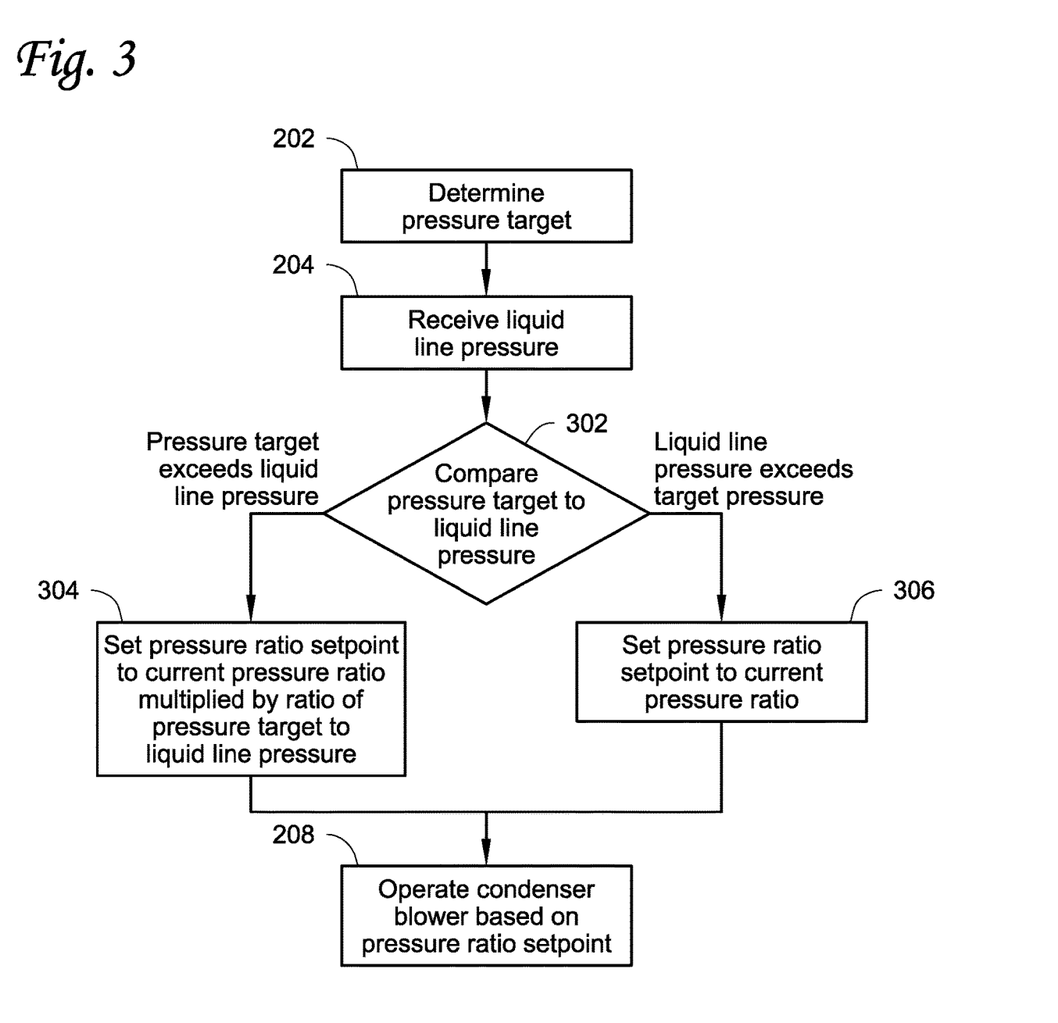
FIG. 3 shows a flowchart of an example method for determining a pressure ratio setpoint according to an embodiment.

A pressure ratio setpoint is determined 206. The pressure ratio setpoint may be based on the pressure target determined at 202 and the liquid line pressure received at 204. The pressure ratio may be defined by the discharge pressure of the compressor of the compressor system divided by the suction pressure of the compressor. Airflow over a condenser of the compressor system may affect the discharge pressure, and thus the pressure ratio. The pressure ratio setpoint thus may be used to control airflow over the condenser and the pressure at compressor discharge and the liquid line pressure. In turn, this affects the differential between liquid line pressure and the intermediate pressure and thus the cooling provided to components of the compressor system. In an embodiment, the pressure ratio setpoint may be determined by comparing the pressure target and the liquid line target and based on that comparison, determining the pressure ratio setpoint, as shown in FIG. 3 and described below.

A condenser blower is operated based on the pressure ratio setpoint 208. The operation of the condenser blower based on the pressure ratio setpoint 208 may be accomplished through a control loop for condenser blower airflow including pressure ratio setpoint as a variable. In an embodiment, a mathematical model correlating pressure ratio setpoint with airflow may be referenced to operate the condenser blower according to the pressure ratio setpoint 208. In an embodiment, the speed of rotation of the condenser blower is adjusted according to the control loop. In an embodiment, the control loop used to control the airflow is a closed-loop control. In an embodiment, the control loop used to control the airflow includes a proportional-integral-derivative (PID) control loop.

Figure 4:
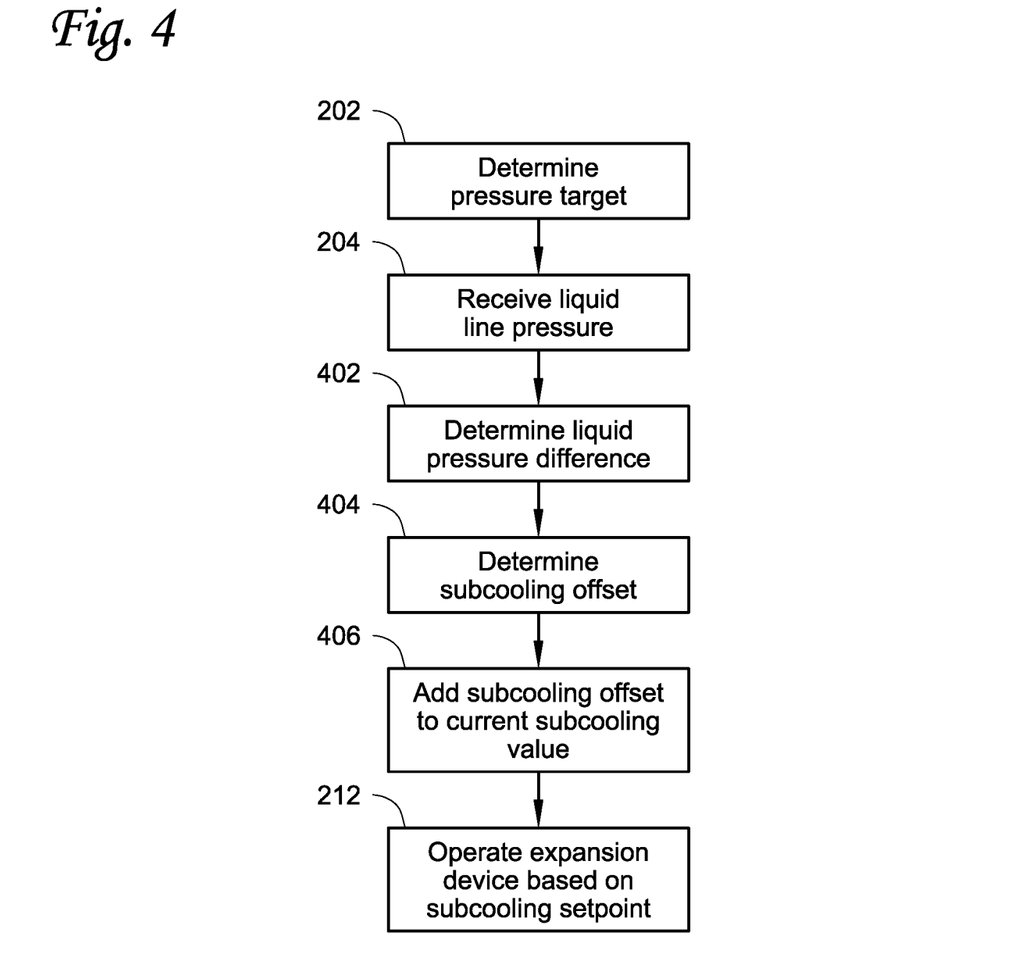
FIG. 4 shows a flowchart of an example method for determining a subcooling setpoint according to an embodiment.

A subcooling setpoint is determined 210. The subcooling setpoint may be a value for subcooling used in control of an expansion device of the compressor system. The expansion device may control flow out of a liquid line of the compressor system, and thus the expansion device may control the liquid line pressure for the compressor system. The liquid line pressure may affect whether one or more compressor system components may be cooled by a cooling system, for example when such cooling systems rely on a pressure difference between the liquid line and an intermediate pressure within the compressor. The subcooling setpoint may be based on a subcooling value and an offset, the offset computed based on the pressure target determined at 202 and the liquid line pressure received at 204. In an embodiment, the subcooling setpoint may be determined by determining a liquid pressure difference, determining a subcooling offset, and adding the subcooling offset to a current subcooling value as shown in FIG. 4 and described below.

An expansion device is operated based on the subcooling setpoint 212. The operation of the expansion device according to the subcooling setpoint 212 may be accomplished through a control loop including subcooling setpoint as a variable. The expansion device may be, for example, expansion device 106 shown in FIG. 1 and described above. The expansion device may have a controllable aperture size. In an embodiment, the expansion device is an electronic expansion valve. In an embodiment, an aperture size of the expansion device is controlled based on the subcooling setpoint 212. In an embodiment, a mathematical model correlating expansion device position with subcooling setpoint is referenced to operate the expansion device. Control based on the subcooling setpoint may reference a current liquid line temperature. In an embodiment, the liquid line temperature may be measured by a temperature sensor. In an embodiment, the control loop used to control the expansion device is a closed-loop control. In an embodiment, the control loop used to control the expansion device includes a PID control loop.

Optionally, method 200 may include receiving the suction pressure 214, receiving the discharge pressure 216, and/or determining the intermediate pressure in the compressor 218. In an embodiment, the suction pressure may be received from a pressure sensor at a suction port of the compressor, such as suction pressure sensor 112 shown in FIG. 1 and described above. In an embodiment, the discharge pressure may be received from a pressure sensor at the discharge port of the compressor, such as discharge pressure sensor 116 shown in FIG. 1 and described above. In an embodiment, the intermediate pressure is determined 218 based on one or more of the suction pressure received at 214 and the discharge pressure received at 216. In an embodiment, the intermediate pressure is determined 218 by taking the square root of the product of the suction pressure received at 214 and the discharge pressure received at 216. In an embodiment, the intermediate pressure determined at 218 is used to determine the pressure target 202.

During operation, the method 200 may iterate, for example by returning from operating the condenser blower 208 and operating the expansion device 212 to receiving the suction pressure 214, receiving the discharge pressure 216, or determining the pressure target 202. The iteration may be continuous, periodic, or triggered based on conditions such as changes to the operating profile of the compressor system, temperature in components of the compressor system, or ambient environmental conditions.

FIG. 3 shows a flowchart of an example method for determining a pressure ratio setpoint according to an embodiment. In the embodiment shown in FIG. 3, when the liquid line pressure is received 204, the pressure target determined at 202 and the liquid line pressure received at 204 are compared 302.

When the pressure target determined at 202 is found to exceed liquid line pressure received at 204 in the comparison at 302, the pressure ratio setpoint is determined based on the current pressure ratio multiplied by a ratio of the pressure target to the liquid line pressure 304. In an embodiment, the formula for determining the pressure ratio target is:

$$\text{Pressure Ratio Setpoint} = (\text{Pressure Target}/\text{Liquid Line Pressure}) * (\text{Discharge Pressure}/\text{Suction Pressure})$$

When the liquid line pressure received at 204 is found to exceed the pressure target determined at 202, the pressure ratio setpoint may be maintained at the current pressure ratio 306.

Once the pressure ratio setpoint is established at either 304 or 306, based on the comparison at 302, the condenser blower may be controlled 208 based on the pressure ratio setpoint 204, as described above.

FIG. 4 shows a flowchart of an example method for determining a subcooling setpoint according to an embodiment. After the target pressure is determined at 202 and the liquid line pressure is received at 204, a liquid pressure difference is determined 402, a subcooling offset is determined 404, and the subcooling offset is added to a current subcooling value 406.

A liquid pressure difference is determined 402. The liquid pressure difference may a value in units of pressure, for example kPa. The liquid pressure difference may be a difference between the target pressure determined at 202 and the liquid line pressure received at 204. In an embodiment, the liquid pressure difference is determined 402 by subtracting the liquid line pressure received at 204 from the target pressure determined at 202.

A subcooling offset is determined 404 based on the liquid pressure difference determined at 402. The subcooling offset may be a temperature value having units in ° F., ° C., or K. In an embodiment, a function is used to convert the liquid pressure difference determined at 402 into a subcooling offset. In an embodiment, a mathematical model correlating liquid pressure difference and subcooling offset is referenced. In an embodiment, a lookup table correlating liquid pressure difference and subcooling offset is referenced. In an embodiment, the subcooling offset determined at 404 is proportional to the liquid pressure difference determined at 402.

The subcooling offset is added to a current subcooling value 406. The subcooling setpoint determined by adding the subcooling offset to the current subcooling value at 406 may then be used to control an expansion device 212 as described above.

Aspects:

It is understood that any of aspects 1-10 can be combined with any of aspects 11-16.

Aspect 1. A method of controlling a compressor system, comprising:

determining a pressure target based on an intermediate pressure within a compressor of the compressor system and a threshold cooling differential pressure value;

determining a pressure ratio setpoint based on the pressure target and a liquid line pressure within a liquid line of the compressor system;

operating an condenser blower at a speed, the speed determined based on the determined pressure ratio setpoint;

determining an subcooling setpoint based on the pressure target and the liquid line pressure in the compressor system; and operating an expansion device based on the determined subcooling setpoint.

Aspect 2. The method according to aspect 1, wherein the intermediate pressure is determined based on a suction pressure of the compressor and a discharge pressure of the compressor.

Aspect 3. The method according to any of aspects 1-2, wherein determining the pressure ratio setpoint comprises:

comparing the pressure target and the liquid line pressure;

when the pressure target exceeds the liquid line pressure, setting the pressure ratio setpoint to a current pressure ratio multiplied by a ratio of the pressure target to the liquid line pressure;

when the liquid line pressure meets or exceeds the pressure target, setting the pressure ratio setpoint to the current pressure ratio.

Aspect 4. The method according to aspect 3, wherein determining the speed comprises referencing a mathematical model correlating pressure ratio and condenser blower speed.

Aspect 5. The method according to any of aspects 3-4, further comprising applying a smoothing function to control a rate of change of the pressure ratio setpoint.

Aspect 6. The method according to any of aspects 3-5, further comprising comparing the determined pressure ratio setpoint to a pressure ratio limit and setting the pressure ratio setpoint to the pressure ratio limit when the determined pressure ratio setpoint exceeds the pressure ratio limit.

Aspect 7. The method according to any of aspects 1-6, wherein determining the subcooling setpoint comprises:

determining a liquid pressure difference based on the pressure target and the liquid line pressure;

determining a subcooling offset based on the liquid pressure difference;

determining the subcooling setpoint based on the subcooling offset and a current subcooling value.

Aspect 8. The method according to aspect 7, wherein determining the subcooling offset comprises referencing a mathematical model correlating the subcooling offset with the liquid pressure difference.

Aspect 9. The method according to any of aspects 7-8, further comprising applying a smoothing function to control a rate of change in the subcooling setpoint.

Aspect 10. The method according to any of aspects 7-9, wherein operating the expansion device based on the subcooling setpoint comprises setting an aperture size of the expansion device based on the subcooling setpoint.

Aspect 11. A compressor system, comprising:

a compressor;

a condenser;

an expansion device fluidly connected to the condenser by a liquid line;

a liquid line pressure sensor at a liquid line of the compressor system;

an evaporator;

a blower configured to drive an airflow over the condenser; and a controller, configured to:

determine a pressure target based on an intermediate pressure within the compressor and a threshold cooling differential pressure value;

determine a pressure ratio setpoint based on the pressure target and a liquid line pressure measured by the liquid line pressure sensor;

control the blower to operate at a speed determined based on the determined pressure ratio setpoint;

determine a subcooling setpoint based on the pressure target and the liquid line pressure in the compressor system; and control the expansion device to operate based on the subcooling setpoint.

Aspect 12. The compressor system according to aspect 11, wherein the expansion device is a controllable electronic expansion valve.

Aspect 13. The compressor system according to aspect 12, wherein the processor is configured to control the expansion device to operate based on the subcooling setpoint by setting an aperture size for the controllable electronic expansion valve.

Aspect 14. The compressor system according to any of aspects 11-13, further comprising a suction pressure sensor located at the suction of the compressor and a discharge pressure sensor located at the discharge of the compressor, and wherein the processor is further configured to determine the intermediate pressure within the compressor based on a suction pressure measured by the suction pressure sensor and a discharge pressure measured by the discharge pressure sensor.

Aspect 15. The compressor system according to any of aspects 11-14, wherein the controller is configured to determine a pressure ratio setpoint by:

comparing the pressure target and the liquid line pressure;

when the pressure target exceeds the liquid line pressure, setting the pressure ratio setpoint to a current pressure ratio multiplied by a ratio of the pressure target to the liquid line pressure; and when the liquid line pressure meets or exceeds the pressure target, setting the pressure ratio setpoint to the current pressure ratio.

Aspect 16. The compressor system according to any of aspects 11-15, wherein the controller is configured to determine a subcooling setpoint by:

determining a liquid pressure difference based on the pressure target and the liquid line pressure;

determining a subcooling offset based on the liquid pressure difference; and determining the subcooling setpoint based on the subcooling offset and a current subcooling value.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of controlling a compressor system, comprising:
   determining a pressure target based on an intermediate pressure within a compressor of the compressor system and a threshold cooling differential pressure value;
   determining a pressure ratio setpoint based on the pressure target and a liquid line pressure within a liquid line of the compressor system;
   operating a condenser blower at a speed, the speed determined based on the determined pressure ratio setpoint;
   determining a subcooling setpoint based on the pressure target and the liquid line pressure in the compressor system; and
   operating an expansion device based on the determined subcooling setpoint.

2. The method of claim 1, wherein the intermediate pressure is determined based on a suction pressure of the compressor and a discharge pressure of the compressor.

3. The method of claim 1, wherein determining the pressure ratio setpoint comprises:
   comparing the pressure target and the liquid line pressure;
   when the pressure target exceeds the liquid line pressure, setting the pressure ratio setpoint to a current pressure ratio multiplied by a ratio of the pressure target to the liquid line pressure;
   when the liquid line pressure meets or exceeds the pressure target, setting the pressure ratio setpoint to the current pressure ratio.

4. The method of claim 3, wherein determining the speed comprises referencing a mathematical model correlating pressure ratio and condenser blower speed.

5. The method of claim 3, further comprising applying a smoothing function to control a rate of change of the pressure ratio setpoint.

6. The method of claim 3, further comprising comparing the determined pressure ratio setpoint to a pressure ratio limit and setting the pressure ratio setpoint to the pressure ratio limit when the determined pressure ratio setpoint exceeds the pressure ratio limit.

7. The method of claim 1, wherein determining the subcooling setpoint comprises:
   determining a liquid pressure difference based on the pressure target and the liquid line pressure;
   determining a subcooling offset based on the liquid pressure difference;
   determining the subcooling setpoint based on the subcooling offset and a current subcooling value.

8. The method of claim 7, wherein determining the subcooling offset comprises referencing a mathematical model correlating the subcooling offset with the liquid pressure difference.

9. The method of claim 7, further comprising applying a smoothing function to control a rate of change in the subcooling setpoint.

10. The method of claim 7, wherein operating the expansion device based on the subcooling setpoint comprises setting an aperture size of the expansion device based on the subcooling setpoint.

11. A compressor system, comprising:
    a compressor;
    a condenser;
    an expansion device fluidly connected to the condenser by a liquid line;
    a liquid line pressure sensor at a liquid line of the compressor system;
    a condenser;
    a blower configured to drive an airflow over the condenser; and
    a controller, configured to:
       determine a pressure target based on an intermediate pressure within the compressor and a threshold cooling differential pressure value;
       determine a pressure ratio setpoint based on the pressure target and a liquid line pressure measured by the liquid line pressure sensor;
       control the blower to operate at a speed determined based on the determined pressure ratio setpoint;
       determine a subcooling setpoint based on the pressure target and the liquid line pressure in the compressor system; and
       control the expansion device to operate based on the subcooling setpoint.

12. The compressor system of claim 11, wherein the expansion device is a controllable electronic expansion valve.

13. The compressor system of claim 12, wherein the processor is configured to control the expansion device to operate based on the subcooling setpoint by setting an aperture size for the controllable electronic expansion valve.

14. The compressor system of claim 11, further comprising a suction pressure sensor located at the suction of the compressor and a discharge pressure sensor located at the discharge of the compressor, and wherein the processor is further configured to determine the intermediate pressure within the compressor based on a suction pressure measured by the suction pressure sensor and a discharge pressure measured by the discharge pressure sensor.

15. The compressor system of claim 11, wherein the controller is configured to determine a pressure ratio setpoint by:
    comparing the pressure target and the liquid line pressure;
    when the pressure target exceeds the liquid line pressure, setting the pressure ratio setpoint to a current pressure ratio multiplied by a ratio of the pressure target to the liquid line pressure; and
    when the liquid line pressure meets or exceeds the pressure target, setting the pressure ratio setpoint to the current pressure ratio.

16. The compressor system of claim 11, wherein the controller is configured to determine a subcooling setpoint by:
    determining a liquid pressure difference based on the pressure target and the liquid line pressure;
    determining a subcooling offset based on the liquid pressure difference; and
    determining the subcooling setpoint based on the subcooling offset and a current subcooling value.

* * * * *